United States Patent [19]
Litchfield

[11] 3,862,536
[45] Jan. 28, 1975

[54] HIGH SPEED LOADING OF REEDBLADES
[75] Inventor: Kenneth W. Litchfield, Chicago, Ill.
[73] Assignee: GTE Automatic Electric Laboratories Incorporated, Northlake, Ill.
[22] Filed: Mar. 21, 1973
[21] Appl. No.: 343,616

[52] U.S. Cl. .................................. 53/246, 53/77
[51] Int. Cl. .............................. B65b 5/08
[58] Field of Search ............ 53/160, 236, 244, 246, 53/77; 221/212, 211, 171–173

[56] References Cited
UNITED STATES PATENTS

| | | | |
|---|---|---|---|
| 2,581,042 | 1/1952 | Otto | 53/236 |
| 2,602,942 | 7/1952 | Otto | 53/236 X |
| 2,996,863 | 8/1961 | Odell | 53/236 |
| 3,311,259 | 3/1967 | Brown | 221/212 |
| 3,445,987 | 5/1969 | Likhacher et al. | 53/236 X |
| 3,509,690 | 5/1970 | Fluhrer et al. | 53/246 |
| 3,563,377 | 2/1971 | Southcott | 198/33 X |
| 3,599,783 | 8/1971 | Burgess, Jr. | 198/33 X |

*Primary Examiner*—J. M. Meister

[57] ABSTRACT

A reed loading machine incorporating a high speed loading apparatus for dispensing reeds having a common orientation into racks for subsequent processing is disclosed. More particularly, the mechanism comprises a vibratory feeder means for orienting a plurality of reeds in a common direction and a magnetic hopper means including a magazine for storing the oriented reeds in a horizontal position. The magnetic hopper means further includes magnetizing means for establishing a magnetic field across the magazine to maintain the reeds in a horizontally oriented position until a conveyor means removes the reeds from the magazine output and transports them to a loading station. In accordance with one embodiment, the conveyor means comprises a rotating wheel positioned at substantially a 45° angle between the magazine output and the loading station. The edge of the wheel is beveled to be substantially horizontal at the magazine output but substantially vertical at the loading station. The horizontally oriented reeds are, in turn, secured to the beveled edge by means of a vacuum and transported to the loading station where the vacuum is removed. Accordingly, the vertically re-oriented reeds drop into the receptacles of a rack which is simultaneously being advanced past the loading station.

7 Claims, 3 Drawing Figures

HIGH SPEED LOADING OF REEDBLADES

BACKGROUND OF THE INVENTION

The present invention relates generally to improvements in reed loading machines used in the manufacture of reed contact switches and more particularly to a high speed loading apparatus for arranging a plurality of reeds to a common orientation and loading the oriented reeds into a rack for subsequent processing, such as electroplating.

Reed contact switches, which are commonly used in telephone switching circuits, generally comprise a pair of flexible reeds aligned in a partially overlapping relationship and sealed in a glass envelope. One type of reed in common use today comprises a thin, flat rectangular portion, or blade, ending in a cylindrical shank portion. The reeds are mounted in the glass envelope so that their blade portions overlap without making physical contact while their respective shanks extend from opposite ends of the glass envelope, allowing external electrical connections to be made.

When the reeds, which are composed of a paramagnetic material, are energized, the reed blades are flexed to make physical contact with each other thereby completing an electrical circuit. To insure good conductivity between the reed blades, the blades are typically plated with a conductive metal, such as silver or gold. Accordingly, mass production of the reed contact switches is facilitated if a number of reeds are plated simultaneously. Moreover, to conserve the amount of precious metals (i.e., gold and/or silver) consumed in the electroplating process, the reeds are selectively plated only at the contact points of the blades. Accordingly, the blades are loaded into the plating racks with a common orientation (e.g., blade end up) to facilitate the electroplating process.

One prior art apparatus commonly utilized for loading reeds into a plating rack with a common orientation includes a vibratory feeder to orient the reeds end-for-end. The reeds are then fed into the upper end of a non-magnet vertical gravity chute and advanced vertically in a single file column toward the lower end of the chute. A magnetic assembly is initially positioned near the lower end of the chute to stop the leading reed. The magnet assembly has end portions of the same polarity, which align with the ends of the leading reed, inducing poles of the opposite polarity at both ends of that reed. The magnet is then moved upward along the chute where it aligns with the following reed so that the leading reed is repelled by the following reed and dispensed from the chute into the rack. Consequently, by reciprocating the magnet assembly, an entire rack can be loaded.

However, the cross-sectional area of the vertical gravity chute must be sufficiently narrow to constrain the reeds in an end-to-end column while at the same time providing sufficient clearance for the reeds to fall freely through the chute, the prior art apparatus is susceptible to jamming. Further, the utilization of the reciprocating magnet assembly limits the speed at which the reeds can be dispensed into the rack. Accordingly, there is need for a reed loading machine having high speed capabilities which is less susceptible to jamming.

SUMMARY OF THE INVENTION

The high speed loading apparatus of the present invention is incorporated in a reed loading machine having an indexing device, or table, for advancing a rack, or tray, comprising a plurality of receptacles past a loading station where reeds having a common orientation are loaded into the receptacles for subsequent processing.

The high speed loading apparatus includes feeder means for disentangling a plurality of reeds and subsequently orienting the reeds in a common direction.

The oriented reeds are then introduced into a magnetic hopper means and stored in a substantially horizontal position in parallel with one another. More particularly, the magnetic hopper means includes a non-magnetic storage magazine and a magnetizing means for establishing a magnetic field horizontally thereacross. The magnetic field magnetizes the paramagnetic reeds, and consequently, the reeds are aligned with the horizontal flux lines of the magnetic field. The non-magnetic storage magazine, in turn, is effective to restrict the reeds to the space within the magazine. In one embodiment of the invention, the magnetizing means comprises a pair of plate magnets positioned at opposite sides of the magazine and inclined outwardly at the top so that a stronger magnetic field is developed at the bottom of the magazine than at the top. Accordingly, the horizontally oriented reeds are attracted to the bottom of the magazine by the stronger magnetic field.

A conveyor means removes the horizontally oriented reeds from the magnetic hopper means and transports reeds to the loading station at a rate corresponding to the advancement of the rack past the loading station. Moreover, the conveyor means is effective to re-orient the reeds to a substantially vertical position for loading into the receptacles.

In accordance with an embodiment of the invention, the conveyor means may comprise a rotating wheel positioned between the output of the magazine and the loading station. More particularly, the wheel is at substantially a 45° angle and has a beveled edge which is substantially horizontal at a point coincident with the magazine output and is substantially vertical at the loading station. Slots are provided at equal intervals in the beveled edge so that the horizontally oriented reeds can be removed from the magazine and secured in the slots by means of a vacuum. The wheel is then effective to transport the reeds to the loading station where the reeds are in a substantially vertical position. The vacuum is removed just prior to the slot reaching the loading station, and the reed falls into the rack receptacle as a result of gravitational forces.

As a further feature of the invention, sensor means may be provided to disable the high speed loading apparatus whenever two successive empty slots are detected at a point just after the slots have passed through the magazine.

While the present invention is especially directed to a high speed loading apparatus incorporated in a reed loading machine, it should be understood that the principals of the present invention are equally adaptible to other applications where articles are to be loaded into corresponding receptacles at a desired orientation.

BRIEF DESCRIPTION OF THE DRAWINGS

The features of this invention which are believed to be novel are set forth with particularity in the appended claims. The invention may be best understood, however, by reference to the following description taken in conjunction with the accompanying drawings, in which like reference numerals identify like elements in the several figures and in which:

PREFERRED EMBODIMENT OF THE INVENTION

Figure 1:
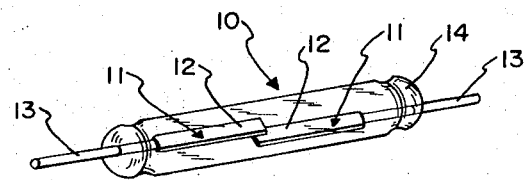
FIG. 1 is a perspective view of a reed contact switch incorporating a pair of reeds.

Referring now to FIG. 1, there is shown a reed contact switch 10 comprising a pair of reeds 11, each having a blade portion 12 and a shank portion 13. More particularly, the blades 12 are encased within a sealed glass envelope 14 while the shanks 13 extend from the envelope 14 to provide for external electrical connections. Further, the blades 12 are aligned in a parallel relationship so that a portion of each blade overlaps a corresponding portion of the other blade without actually touching it. Accordingly, the reed contact switch 10 may be closed by energizing a coil (not shown) encompassing the envelope 14 so that the flexible reed blades 12 are displaced to contact each other, completing the electrical circuit.

Figure 2:
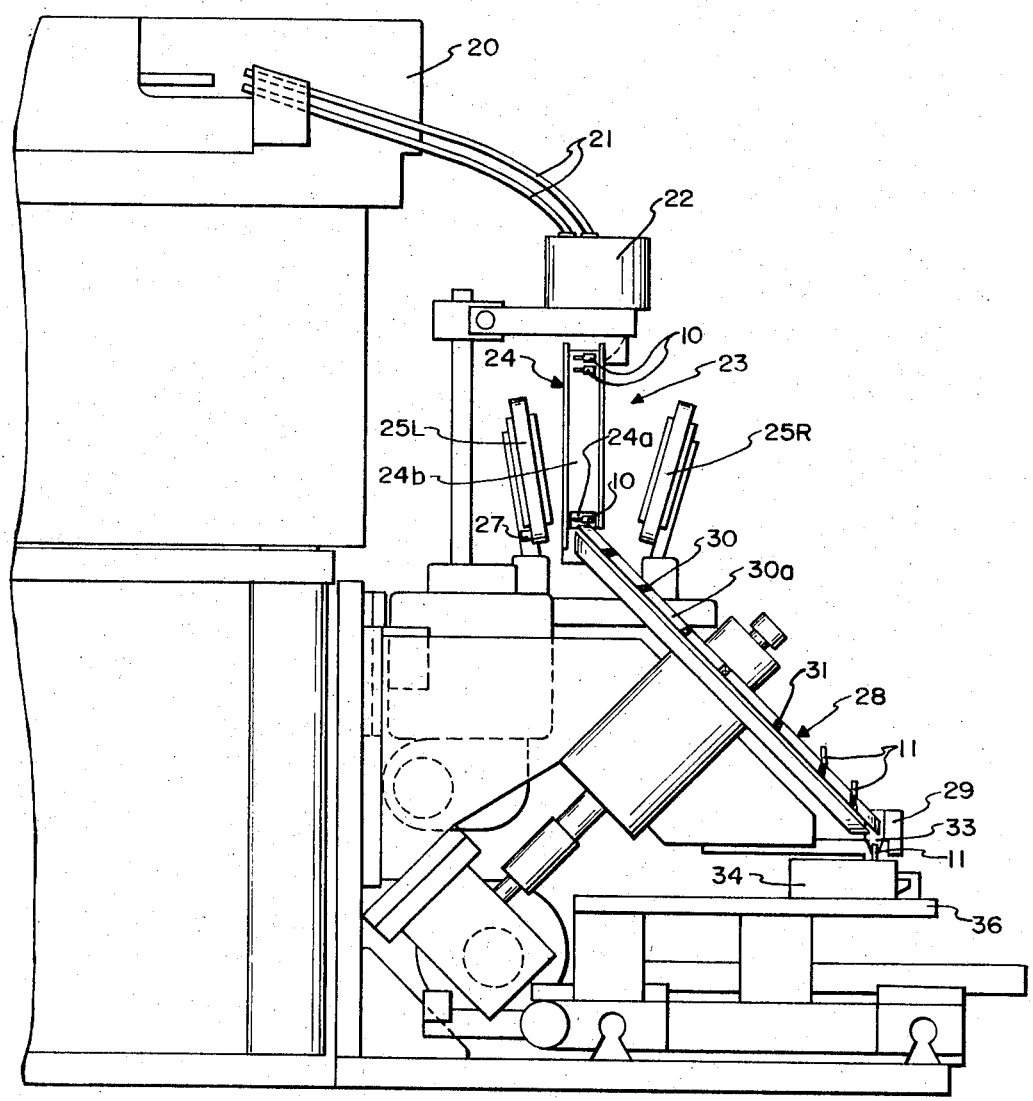
FIG. 2 is a side elevational view of a reed loading machine incorporating a high speed loading apparatus in accordance with a preferred embodiment of the invention.

The reed loading machine shown in FIG. 2 incorporates a high speed loading apparatus for loading a plurality of reeds into the corresponding receptacles of a rack shank-end-first to facilitate, for example, the electroplating of the blades 12 on a mass scale. It includes a bowl-type vibratory feeder 20 which disentangles a plurality of reeds placed therein and orients them in a common direction with their respective shank portions leading. While a vibratory feeder 20 has been utilized in the present embodiment, any apparatus providing a supply of reeds having the above-mentioned orientation would be equally well-suited for purposes of the present invention.

The oriented reeds, with their respective shank portions leading, are then discharged into a plurality of parallel tubes 21 which, in turn, are positioned substantially as shown in FIG. 2 so that the oriented reeds travel downwardly therethrough in response to the gravitational force. The reeds are subsequently discharged into a corresponding plurality of parallel curved chutes 22. The curved chutes 22 re-orient the reeds so that they are substantially horizontal upon exiting the chutes 22 and in parallel with one another.

The horizontally oriented reeds then come under the influence of a magnetic suspension hopper, identified generally at 23 comprising a non-magnetic magazine 24 and a pair of plate magnets 25L and 25R positioned on opposite sides of the magazine 24. The magazine 24 restricts the horizontal movement of the reeds stored therein while the plate magnets 25L and 25R establish a horizontal magnetic field thereacross. Consequently, when the horizontally oriented reeds are discharged from the curved chutes 22, the reeds are aligned with the horizontal flux lines of the magnetic field. Thus, the horizontal orientation of the reeds is maintained so that the reeds do not tumble to the bottom of the magazine 24 as a result of gravity.

In order to facilitate the orderly downward movement of the horizontally oriented reeds from the chutes 22 of the output of the magnetic suspension hopper 23 (i.e., the magazine output 24a), the plate magnets 25L and 25R are inclined or tilted so that their physical separation is less at the bottom end of the magazine 24 than at the top end. Accordingly, the magnetic field induced across the magazine 24 is stronger at the bottom than at the top. Also, plate magnet 25L is positioned closer to the magazine 24 than the plate magnet 25R to insure that most of the reeds are attracted to the magazine wall nearest plate magnet 25L. Thus, increasing magnetic field strength together with gravity combine to attract the horizontally oriented reeds down the magazine wall 24b to the bottom of the magazine 24. Consequently, the reeds are directed to the output of the magazine 24 by positioning the plate magnets 25L and 25R to develop the strongest magnetic field at a point corresponding to the magazine output 24a. This may be more clearly seen in FIG. 3. Further, a tuning magnet 27 is positioned on plate magnet 25L to supplement the magnetic field developed at the magazine output 24a.

As the horizontally oriented reeds reach the magazine output 24a, they are removed from the magnetic suspension hopper 23 by a continuously rotating wheel 28, or alternatively, a rotary conveyor. The wheel 28, comprising any suitable non-magnetic material, lies in a plane which is at substantially a 45° angle with the horizontal reference plane. As the wheel 28 rotates, it passes through the magazine output 24a at the uppermost point of its rotation, removing the reeds from the magazine 24 and transporting them to a loading station, comprising guide block 29, at a point across the wheel 28 directly opposite the magazine 24.

The circumferential edge of the wheel 28 is beveled at a 45° angle so that it is substantially horizontal as it passes through the magazine output 24a. As the wheel 28 rotates the beveled edge is re-oriented from the substantially horizontal position at the magazine output 24a to a substantially vertical position at the loading station. Accordingly, when the rotating wheel 28 removes the horizontally oriented reeds from the magnetic suspension hopper magazine 24, it not only transports the reeds to the loading station, but also simultaneously re-orients the reeds to a substantially vertical position.

Figure 3:
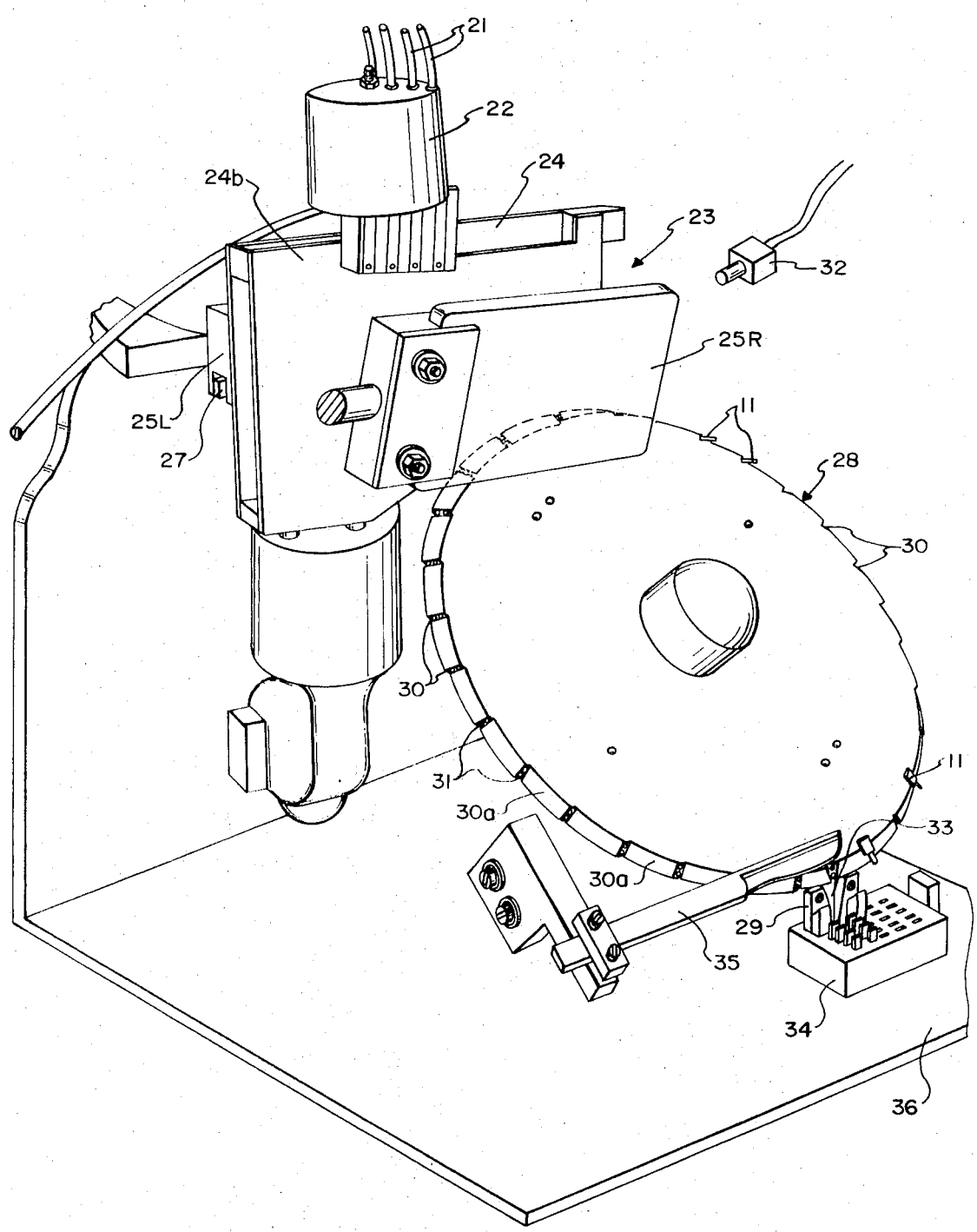
FIG. 3 is a partial frontal view of the reed loading machine shown in FIG. 2 useful in understanding the operation of the high speed loading apparatus of the present invention.

The physical relationship between the magazine 24, wheel 28 and guide block 29, together with various features of each, may be more easily understood by reference to FIG. 3. There, it can be seen that a series of slots 30 are disposed at equal intervals around the circumference of wheel 28 on its beveled edge. Each slot 30 is able to accommodate a single reed. It can also be seen in FIG. 3 that a pair of apertures 31 are provided in each slot 30. The apertures 31 are associated with a vacuum producing means (not shown) for creating a vacuum to secure a reed 11 in the slot 30. Consequently, as each slot 30 on the beveled edge of wheel 28 passes through the magazine output 24a, a horizontally oriented reed is positioned in the slot 30 and secured therein by a vacuum. In addition, to facilitate the loading of reeds into the slots 30, each slot 30 is provided with a sloped "lead-in" edge 30a, giving the wheel 28 a sawtooth appearance.

A sensor 32 is positioned near the magazine output 24a and adjacent to the beveled edge of wheel 28. The sensor 32 detects the presence of reeds in the slots 30, generating a control signal to disable the reed loading machine whenever two consecutive slots 30 pass the sensor 32 without having a reed secured therein.

As the wheel 28 transports each reed to the loading station, re-orienting the reed from a horizontal position to a substantially vertical position, the vacuum is removed at a predetermined point just before the reed reaches the loading station which comprises a guide block 29 having a tapered channel 33 provided therein. Because the vacuum is removed before the loaded slot reaches the guide block 29, the reed begins to fall so that it enters the tapered channel 33 and passes therethrough to a receptacle in the rack 34 positioned below.

Occasionally, the reed may adhere to the slot 30, even after the vacuum is removed because of cohesion or contaminants in the slot 30. Accordingly, a mechanical stripping device 35, such as that shown in FIG. 3, is provided to physically separate the reed 11 from the slot 30 as it approaches the loading station. More particularly, the mechanical stripping device 35 comprises a curved blade which contacts a portion of the reed 11 extending from the slot 30 thereby forcing the reed 11 from the slot 30 and breaking the vacuum. Thus, the reed 11 is channeled through the guide block 29 and loaded into the corresponding receptacle in the rack 34 by gravity.

The rack 34, in turn, is mounted on an indexing table 36, which periodically advances the rack 34 at a rate corresponding to the delivery of reeds to the loading station so that each empty receptacle receives a single reed. That is, the wheel 28 is synchronized with the indexing table 36 so that the rack 34 is advanced at a rate corresponding to the rate at which reeds are delivered to the loading station. When a row of receptacles in the rack 34 has been filled, the rack 34 may be manually or automatically repositioned to the next row. Once the entire rack 34 has been loaded with properly oriented reeds, that is, having their respective blades extending from the receptacles of the rack 34, the reeds are ready for subsequent processing, such as electroplating.

Accordingly, there has been shown a high speed loading apparatus incorporated in a reed loading machine for loading a supply of reeds into a rack with a desired orientation for subsequent processing. The magnetic suspension hopper provided to store the reeds until they can be removed and inserted into the rack is less susceptible to jamming than other prior art arrangements. Moreover, the provision of a rotating vacuum wheel for simultaneously conveying and re-orienting the reeds prior to being loaded into the racks facilitates high speed loading. Thus, the loading operation may be accomplished in less time than was heretofore possible using prior art reciprocating apparatus.

Although the present embodiment and the appended claims describe the apparatus of the present invention with reference to the horizontal plane, it should be understood that the high speed loading apparatus is operable through a wide range of physical orientations. That is, the loading apparatus (i.e., the magnetic suspension hopper and the rotating vacuum wheel) can be tilted with respect to the horizontal reference without materially affecting its operation.

Accordingly, while a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. In a reedloading machine having an indexing device for advancing a rack comprising a plurality of receptacles past a loading station where reeds are loaded into the receptacles, a high-speed loading apparatus comprising:

feeder means for disentangling a plurality of said reeds and orienting said reeds in a common direction;

magnetic hopper means for storing each of said directionally oriented reeds including a non-magnetic storage magazine having an input at the top and output at the bottom and means for establishing a magnetic field horizontally across said magazine to thereby magnetize and maintain said reeds in a substantially horizontal orientation and substantially parallel to one another; and conveyor means including a rotating wheel disposed between said magazine output and said loading station, said wheel having a beveled edge with slots provided therein at equal intervals around the circumference thereof, said wheel being positioned such that said beveled edge is substantially horizontal at a point coincident with said magazine output and substantially vertical at a point adjacent to said loading station, and means for selectively creating a vacuum in said slots;

whereby upon rotation of said wheel said horizontally oriented reeds are taken up in said slots and secured therein by said vacuum, transported to said loading station while simultaneously being re-oriented substantially vertically, and released such that each of said reeds fall by gravity into a corresponding one of said storage rack receptacles.

2. Apparatus in accordance with claim 1 further including mechanical stripping means for removing said reeds from said slots.

3. Apparatus in accordance with claim 2 wherein said mechanical stripping means comprises a curved blade disposed such as to engage and force said reeds from said slots.

4. Apparatus in accordance with claim 1 further including means disposed adjacent said magazine output for sensing the presence of reeds in said slots and for disabling said reedloading machine upon sensing a plurality of successive empty slots.

5. Apparatus in accordance with claim 1 wherein said feeder means comprises a vibratory bowl-type feeder for orienting said reeds, a plurality of tubes for transporting oriented reeds from said vibratory feeder toward said magazine input in a non-horizontal orientation, and a corresponding plurality of curved chutes disposed at the ends of said tubes for re-orienting and depositing said reeds horizontally into said magazine.

6. Apparatus in accordance with claim 1 wherein said magnetic field establishing means includes first and second plate magnets disposed at opposite sides of said magazine and inclined with respect thereto to provide a stronger magnetic field at the bottom of said magazine than at the top to thereby attract said horizontally oriented reeds toward the bottom of said magazine.

7. Apparatus in accordance with claim 6 further including a tuning magnet disposed adjacent said magazine output and cooperating with said plate magnets to maximize the strength of said magnetic field and attract said reeds toward said magazine output.

* * * * *